United States Patent
Tung et al.

(10) Patent No.: US 8,243,816 B2
(45) Date of Patent: Aug. 14, 2012

(54) ENTROPY DECODING METHOD

(75) Inventors: Yi-Shin Tung, Taipei Hsien (TW);
Hsieh-Fu Tsai, Taipei Hsien (TW);
Yi-Shin Li, Taipei Hsien (TW);
Sheng-Che Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 456 days.

(21) Appl. No.: 12/639,136

(22) Filed: Dec. 16, 2009

(65) Prior Publication Data
US 2011/0099208 A1 Apr. 28, 2011

(30) Foreign Application Priority Data
Oct. 22, 2009 (CN) .......................... 2009 1 0308655

(51) Int. Cl.
*H04N 11/04* (2006.01)
(52) U.S. Cl. .......... 375/240.23; 375/240.26; 375/240.25
(58) Field of Classification Search ............. 375/240.23, 375/240.26, 240.25
See application file for complete search history.

(56) References Cited

U.S. PATENT DOCUMENTS

| 7,215,265 B2* | 5/2007 | Guionnet et al. ............. 341/107 |
| 7,928,868 B1* | 4/2011 | Huang et al. .................. 341/107 |
| 2006/0028359 A1* | 2/2006 | Kim et al. ........................ 341/50 |
| 2007/0014367 A1* | 1/2007 | Zhou ......................... 375/240.23 |
| 2009/0168868 A1* | 7/2009 | Jahanghir ................ 375/240.02 |

* cited by examiner

*Primary Examiner* — David Czekaj
*Assistant Examiner* — Jonathan Torchman
(74) *Attorney, Agent, or Firm* — Altis Law Group, Inc.

(57) ABSTRACT

An entropy decoding method includes retrieving video data corresponding to an microcode, operating an entropy decoding operation on the video data to acquire a result, and retrieving video data corresponding to a subsequent microcode according to a MPS synchronously. The method further includes determining if the MPS matches the result, and operating an entropy decoding operation according to the subsequent microcode on the video data corresponding to the subsequent microcode if the MPS matches the result.

9 Claims, 3 Drawing Sheets

| 17 - 13 | 12 - 9 | 8 - 6 | 5 - 4 | 3 - 0 |
|---|---|---|---|---|
| Operation(BDS, ret, ...) | ctx_diff | Val_diff | N_diff | pc_diff |

FIG. 2

ENTROPY DECODING METHOD

BACKGROUND

1. Technical Field

Embodiments of the present disclosure relate to video decoding, and more particularly to an entropy decoding method.

2. Description of Related Art

H.264/AVC, defined by ITU-T organization and MPEG organization, provides improved efficiency and applicability with the Internet than H.263 or MPEG-4 simple profile. Therefore, H.264/AVC is widely used for video data encoding and decoding.

H.264/AVC defines detail flows of video data decoding including inverse discrete cosine transforming (IDCT), entropy decoding, and others. The entropy decoding plays an important part in the video data decoding flow of H.264/AVC. As decoding speed is a most important characteristic of video data decoding, improving entropy decoding speed can directly improve decoding speed of H.264/AVC video data.

BRIEF DESCRIPTION OF THE DRAWINGS

The details of the disclosure, both as to its structure and operation, can best be understood by referring to the accompanying drawings, in which like reference numbers and designations refer to like elements.

FIG. 2 is a schematic diagram of microcodes stored in a microcode storage system of the entropy decoding device of FIG. 1.

DETAILED DESCRIPTION

Figure 1:
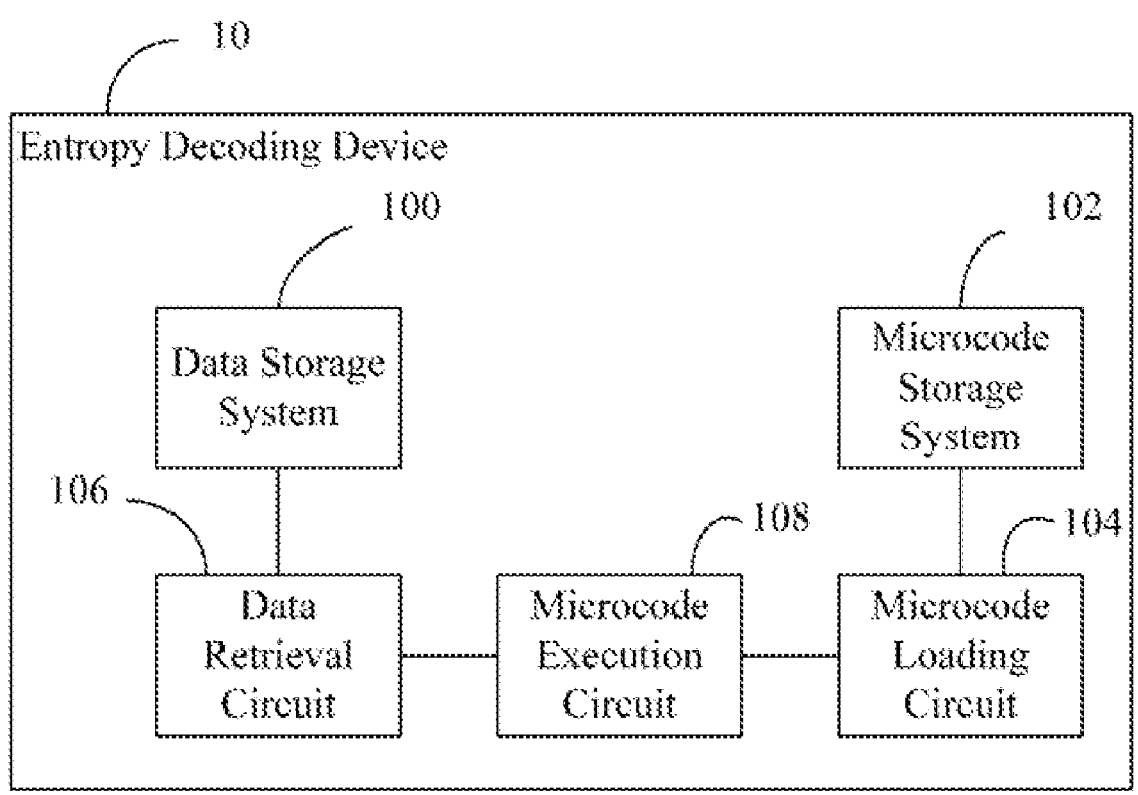
FIG. 1 is a schematic diagram of functional modules of one embodiment of an entropy decoding device to process an entropy decoding method of the present disclosure.

FIG. 1 is a schematic diagram of functional modules of one embodiment of an entropy decoding device 10 to process an entropy decoding method of the present disclosure. The video data is encoded using binary arithmetic code (BAC) of H.264/AVC standard.

H.264/AVC standard defines decoding tables and flows. Each of the decoding tables corresponds to a decoding tree including a plurality of nodes. Entropy decoding obtains a path to the decoding tree according to the video data and then obtains a decoding value corresponding to a leaf node according to the path. Alternatively, the video data can be encoded using other standards compatible with H.264/AVC standard.

The entropy decoding device 10 includes a data storage system 100, a microcode storage system 102, a microcode loading circuit 104, a data retrieval circuit 106, and a microcode execution circuit 108.

The data storage system 100 is configured and structured to store the video data.

The microcode storage system 102 is configured and structured to store a plurality of microcode groups each corresponding to the decoding trees. Each microcode group includes a series of microcodes.

The microcode loading circuit 104 is configured and structured to load one of the microcode groups corresponding to one of the decoding trees required by the entropy decoding from the microcode storage system 102.

The data retrieval circuit 106 is configured and structured to retrieve video data corresponding to the microcodes.

The microcode execution circuit 108 is configured and structured to execute entropy decoding operations on the video data according to the microcodes.

FIG. 2 is a schematic diagram of one embodiment of the microcodes stored in the microcode storage system 102 of the entropy decoding device 10 in FIG. 1. The microcodes are predetermined according to the decoding trees. Each decoding tree corresponds to one of the microcode groups and each node of the decoding tree has one corresponding microcode. Each non-leaf node is connected to a left node and a right node. Therefore, each non-leaf node corresponds to two microcodes, one corresponding to the left node, the other to the right one. In one embodiment, the microcodes are binary numbers.

H.264/AVC standard defines a most probable symbol (MPS) for each non-leaf node of each decoding tree. The MPS indicates that it is most probable to visit the left node or the right node. The MPS is signed by 0 and 1, 0 indicating to visit the left node, 1 indicating to visit the right node. As such, each microcode of the non-leaf node corresponds to one MPS.

In one embodiment, each microcode includes several fields, such as a decoding instruction and a plurality of decoding differences. It should be noted that the microcode is not limited to only the decoding instruction and the decoding differences, and can further include other fields if required.

The decoding instruction controls entropy decoding of the video data. In one embodiment, the decoding instruction of the microcode corresponds to either a decoding operation or a value returning operation.

The decoding operation obtains a result representing execution order of the microcodes. In one embodiment, the decoding operation is generally executed on a microcode corresponding to a non-leaf node, such as a BDS operation on the microcode which can acquire a result which indicating whether a subsequent microcode corresponds to a left node or a right node connected to the non-leaf node.

The value returning operation returns one decoding value according to the results of the decoding operations on the microcodes. In one embodiment, the value returning operation is generally executed on a microcode corresponding to a leaf node.

The plurality of decoding differences provides decoding parameters required by the entropy decoding operation on the video data. In one embodiment, the decoding parameters related to the microcode include a context parameter, a value parameter, a number parameter, and an address parameter. In one embodiment, using the decoding differences to replace the decoding parameters in the microcode can save memory. In other embodiments, the microcode can use the decoding parameters themselves to provide parameters for the entropy decoding operation.

The decoding differences indicate differences between decoding parameters of two adjacent executed microcodes. In one embodiment, the decoding differences include a context difference short for ctx_diff, a value difference short for val_diff, a number difference short for N_diff, and a address difference short for pc_diff. The ctx_diff, the val_diff, the N_diff, and the pc_diff respectively correspond to an initial value. The decoding differences of a root node are corresponding differences between the corresponding decoding parameters of the root node and the corresponding initial value.

The context parameter is operable to control probability tables required by the entropy decoding operation (such as BDS) on the video data. H.264/AVC standard defines a series of probability tables. The BDS operation of the microcode is executed according to a probability table corresponding to the context parameter of the microcode. The context difference is added to an initial value of the context parameter or the context parameter corresponding to a previous adjacent microcode of the microcode to obtain the context parameter of the microcode. That is, the context parameter of the microcode (ctx) is equal to the initial value thereof or the context parameter of the previous adjacent microcode (ctx') of the microcode plus the context difference (ctx_diff), namely "ctx=ctx'+ctx_diff".

The value parameter controls the returned decoding value of the entropy decoding operation on the video data. The value difference is added to an initial value of the value parameter or the value parameter corresponding to a previous adjacent microcode of the microcode to obtain the value parameter of the microcode. That is, the value parameter of the microcode (val) is equal to the initial value thereof or the value parameter of the previous adjacent microcode (val') of the microcode plus the value difference (val_diff), namely "val=val'+val_diff".

In one embodiment, the value difference is defined according to a visit path of a decoding tree and a value of a leaf node of the decoding tree corresponding to the visit path. That is, the value of the leaf node of the decoding tree can be generated by adding the initial value of the value parameter to the value differences according to an operating order of the microcode group corresponding to the visit path of the decoding tree. As such, a decoding value is generated if the value differences of the microcodes of a microcode group are executed according to the operating order.

The number parameter controls the number of returning the decoding value required by one of the microcode groups. The number difference is added to an initial value of the number parameter or the number parameter corresponding to a previous adjacent microcode of the microcode to obtain the number parameter of the microcode. That is, the number parameter of the microcode (N) is equal to the initial value thereof or the number parameter of the previous adjacent microcode (N') of the microcode plus the number difference (N_diff), namely "N=N'+N_diff".

In one embodiment, the number of returning the decoding value required by the microcode group is executed by adding the initial value of the number parameter to the number differences of some of the microcodes of the microcode group according to the operating order of the microcode group. If the number parameter is other than 0 when the decoding value is returned by the microcode execution circuit 108, other operations on the microcode group are required. On the contrary, if the number parameter is 0 when the decoding value is returned by the microcode execution circuit 108, no other operations on the microcode group are required and another microcode group is acquired.

The address parameter is operable to control an address of a subsequent microcode of the microcode. The address difference is operable to be added to an initial value of the address parameter or the address parameter corresponding to a previous adjacent microcode of the microcode to obtain the address parameter of the microcode. That is, the address parameter of the microcode (pc) is equal to the initial value thereof or the address parameter of the previous adjacent microcode (pc') of the microcode plus the address difference (pc_diff), namely "pc=pc'+pc_diff".

In one embodiment, the address difference of the microcode includes a first difference and a second difference. The first difference indicates the address of a microcode related to a left node of the decoding tree. The second difference indicates the address of a microcode related to a right node of the decoding tree. The address difference is the first difference if the MPS or the operating order generated by the decoding operation indicates to a microcode corresponding to the left node. The address difference is the second difference if the MPS or the operating order generated by the decoding operation indicates a microcode corresponding to the right node.

If each microcode relates to the first difference pc_diff0 corresponding to a left node and the second difference pc_diff1 corresponding to a right node, the address difference is defined by a multiplexer to selectively output the first difference pc_diff0 and the second difference pc_diff1. For example, the address difference is pc_diff0 if the MPS is 0, or the address difference is pc_diff1 if the MPS is 1.

In other embodiments, addresses of the microcodes can be indicated by other methods. For example, the address according to a left node can be executed by "pc=pc'+pc_diff" and then the address according to a right node can be executed by "pc=pc'+2*pc_diff".

Each field of the microcode occupies a number of bits. For example, one microcode occupies 18 bits, namely from bit 17 to bit 0. The decoding instruction occupies from bit 17 to 13. The ctx_diff occupies from bit 12 to 9. The val_diff occupies from bit 8 to 6. The N_diff occupies from bit 5 to 4. The pc_diff occupies from bit 3 to 0.

Figure 3:
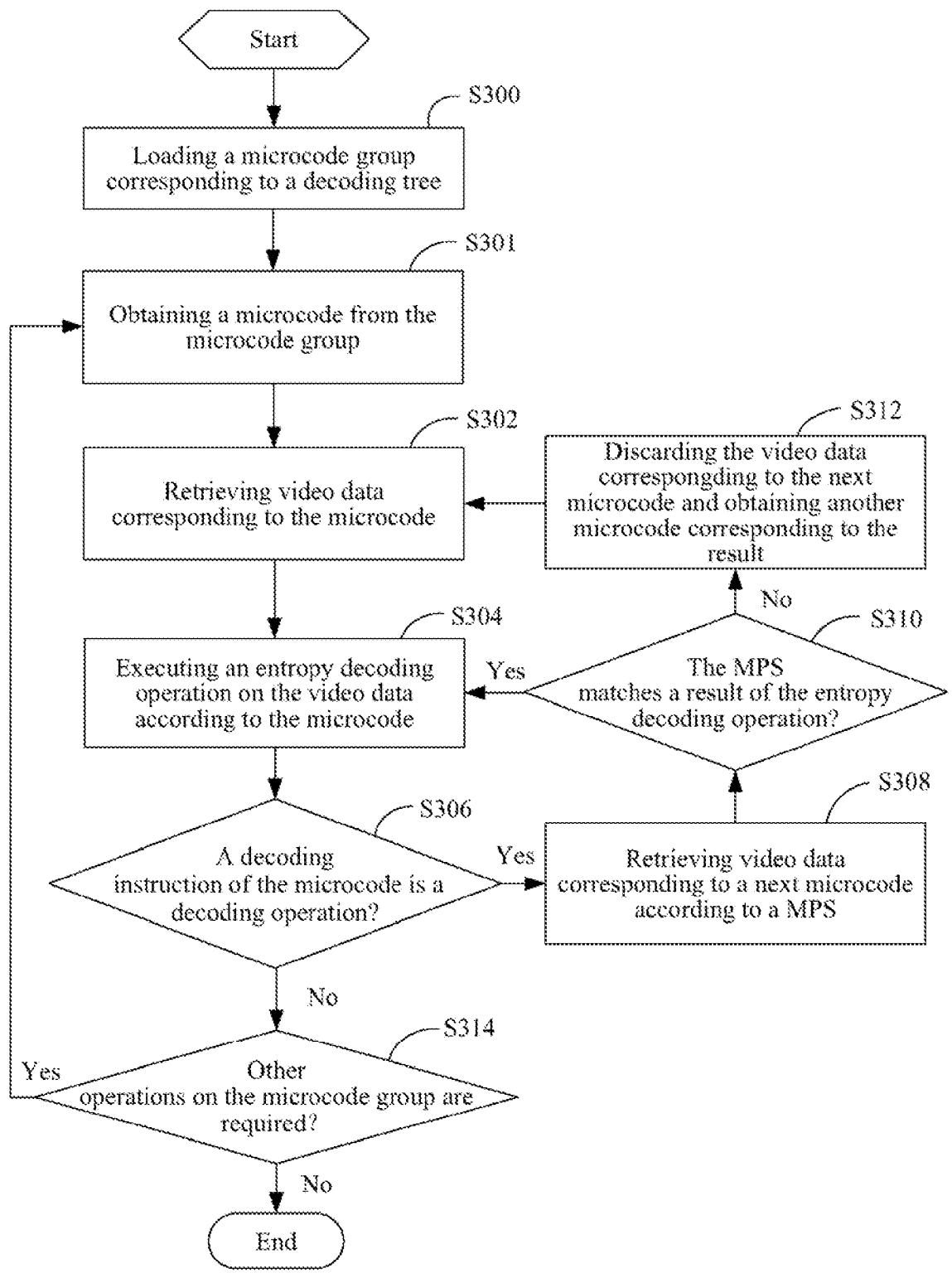
FIG. 3 is a flowchart of one embodiment of the entropy decoding method of the present disclosure.

FIG. 3 is a flowchart of one embodiment of the entropy decoding method of the present disclosure, performed by an entropy decoding device such as, for example, that of FIG. 1.

In block S300, the microcode loading circuit 104 loads one of the microcode groups corresponding to one of the decoding trees acquired by the entropy decoding from the microcode storage system 102.

In block S301, the microcode execution circuit 108 obtains one microcode from the microcode group loaded by the microcode loading circuit 104. In one embodiment, the microcode execution circuit 108 obtains the first microcode according to the initial value of the address parameter.

In block S302, the data retrieval circuit 106 retrieves video data corresponding to the obtained microcode from the data storage system 100.

In block S304, the microcode execution circuit 108 executes an entropy decoding operation on the video data according to the obtained microcode so as to either acquire the result when the decoding instruction of the obtained microcode is the decoding operation or return the decoding value when the decoding instruction of the microcode is the value returning operation. In one embodiment, the microcode execution circuit 108 obtains the decoding parameter according to the decoding differences, and then executes the entropy decoding operation according to the obtained decoding parameter.

For example, if the decoding instruction is the decoding operation, such as BDS, the microcode execution circuit 108 adds the context parameter with the context difference to acquire a new context parameter and then executes a BDS operation on the video data according to the new context parameter. If the decoding instruction is the value returning operation, the microcode execution circuit 108 adds the value parameter with the value difference to acquire a new value parameter and then returns the new value parameter of the microcode group.

In block S306, the data retrieval circuit 106 determines if the decoding instruction of the microcode corresponds to the decoding operation.

If the decoding instruction of the microcode corresponds to the decoding operation, then in block 308, the data retrieval circuit 106 predicts a subsequent microcode according to the MPS corresponding to the obtained microcode and retrieves video data corresponding to the subsequent microcode. The executing entropy decoding operation by the microcode execution circuit 108 in block S304 and the predicting the subsequent microcode and the retrieving video data by the data retrieval circuit 106 in block S308 are done synchronously, namely in one time cycle. As such, the time cycle of the predicting the subsequent microcode and retrieving the video data is not required.

When the microcode execution circuit 108 has accomplished the entropy decoding operation, in block S310, the microcode execution circuit 108 determines if the MPS matches the result of the entropy decoding operation. For example, if the MPS and the result of the entropy decoding operation are both 0 or 1, the MPS matches the result of the entropy decoding operation and the prediction is right. If the MPS is 0 but the result of the entropy decoding operation is 1, or the MPS is 1 but the result of the entropy decoding operation is 0, the prediction is wrong.

If the MPS matches the result, that is the prediction is right, then the microcode execution circuit 108 repeats the block S304 according to the subsequent microcode.

If the MPS does not match the result, that is the prediction is wrong, then in block S312, the microcode execution circuit 108 discards the video data corresponding to the subsequent microcode and obtaining another microcode corresponding to the result. In one embodiment, the microcode execution circuit 108 selects the first difference or the second difference to obtain the address difference according to the result and obtains another microcode according to the obtained address difference. After obtaining the other microcode, the data retrieval circuit 106 repeats the block S302 according to the other microcode.

If the decoding instruction of the microcode corresponds to the value returning operation, then in block S314, the microcode execution circuit 108 determines if other operations on the microcode group are required. In one embodiment, the microcode execution circuit 108 determines if the number parameter of the microcode is 0. The microcode execution circuit 108 confirms other operations on the microcode group are required if the number parameter of the microcode is other than 0 and confirms no other operations on the microcode group are required if the number parameter of the microcode is 0.

If other operations on the microcode group are required, the microcode execution circuit 108 returns to the beginning of the microcode group and repeats the block S301 to obtain the microcodes once again.

If no other operations on the microcode group are required, then the decoding operations corresponding to the microcode group are accomplished. As such, the microcode loading circuit 104 reloads a subsequent microcode group from the microcode storage system 102.

Embodiments of the entropy decoding method of the present disclosure retrieve the video data and execute the microcodes synchronously by the data retrieval circuit 106 and the microcode execution circuit 108. No time cycle for retrieving the video data is required, and decoding efficiency is enhanced. In addition, the memory required by the microcodes is decreased by using the decoding differences to replace the decoding parameters, minimizing the cost of the decoding.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An entropy decoding method for video data related to a plurality of decoding trees, the method comprising:
    (a) storing a plurality of microcode groups corresponding to the plurality of decoding trees in a microcode storage system, wherein each of the microcode groups comprises a series of microcodes each corresponding to a most probable symbol (MPS), and each comprising a decoding instruction corresponding to either a decoding operation operable to acquire a result representing execution order of the microcodes or a value returning operation operable to return one decoding value according to the results of the decoding operations upon the microcodes;
    (b) loading one of the microcode groups corresponding to one of the decoding trees from the microcode storage system using a microcode loading circuit;
    (c) obtaining one microcode from the loaded microcode group using a microcode execution circuit;
    (d) retrieving video data corresponding to the obtained microcode from a data storage system using a data retrieval circuit;
    (e) executing an entropy decoding operation on the retrieved video data according to the obtained microcode so as to either acquire the result when the decoding instruction of the obtained microcode is the decoding operation or return the decoding value when the decoding instruction of the microcode is the value returning operation using the microcode execution circuit, and retrieving video data corresponding to a subsequent microcode according to the MPS of the obtained microcode if the decoding instruction of the microcode is the decoding operation using the data retrieval circuit synchronously;
    (f) determining if the MPS matches the result of the entropy decoding operation using the microcode execution circuit when the microcode execution circuit has accomplished the entropy decoding operation; and
    (g) repeating block (e) according to the subsequent microcode if the MPS matches the result.

2. The entropy decoding method as claimed in claim 1, further comprising:
    (h) discarding the video data corresponding to the subsequent microcode and obtaining another microcode corresponding to the result using the microcode execution circuit if the MPS does not match the result; and
    (i) repeating block (d) according to the another microcode.

3. The entropy decoding method as claimed in claim 1, wherein each of the microcodes further comprises a plurality of decoding differences operable to provide decoding parameters required by the entropy decoding operation on the video data, wherein the decoding differences indicate differences between decoding parameters of two adjacent executed microcodes.

4. The entropy decoding method as claimed in claim 3, wherein the decoding parameters related to the microcode comprise:
    a context parameter operable to control probability tables required by the entropy decoding operation on the video data;
    a value parameter operable to control the returned decoding value of the entropy decoding operation on the video data;

a number parameter operable to control number of returning the decoding value required by one of the microcode groups; and an address parameter operable to control an address of a subsequent microcode of the microcode.

5. The entropy decoding method as claimed in claim 4, further comprising:

(j) determining if other operations on the microcode group are required using the microcode execution circuit if the decoding instruction of the obtained microcode is the value returning operation; and (k) repeating block (c) to retrieve the microcodes once again using the microcode execution circuit if other operations on the microcode group are required.

6. The entropy decoding method as claimed in claim 5, wherein the block of determining if other operations on the microcode group are required comprises:

determining if the number parameter of the microcode is 0; and confirming other operations on the microcode group are required if the number parameter of the microcode is other than 0; or confirming no other operations on the microcode group are required if the number parameter of the microcode is 0.

7. The entropy decoding method as claimed in claim 4, wherein the decoding differences of the microcode comprise:

a context difference operable to be added to an initial value of the context parameter or the context parameter corresponding to a previous adjacent microcode of the microcode to obtain the context parameter of the microcode;

a value difference operable to be added to an initial value of the value parameter or the value parameter corresponding to a previous adjacent microcode of the microcode to obtain the value parameter of the microcode;

a number difference operable to be added to an initial value of the number parameter or the number parameter corresponding to a previous adjacent microcode of the microcode to obtain the number parameter of the microcode; and an address difference operable to be added to an initial value of the address parameter or the address parameter corresponding to a previous adjacent microcode of the microcode to obtain the address parameter of the microcode.

8. The entropy decoding method as claimed in claim 7, wherein the address difference of the microcode comprises:

a first difference to indicate address of a microcode related to a left node of the decoding tree;

a second difference to indicate address of a microcode related to a right node of the decoding tree;

wherein the address difference is the first difference if the MPS or the operating order generated by the decoding operation indicates to a microcode corresponding to the left node, and the address difference is the second difference if the MPS or the operating order generated by the decoding operation indicates a microcode corresponding to the right node.

9. The entropy decoding method as claimed in claim 1, wherein the video data is encoded using binary arithmetic code (BAC) of H.264/AVC standard.

* * * * *